Nov. 12, 1940.       D. R. MERCHANT       2,221,103
HOISTING DEVICE
Filed June 9, 1939
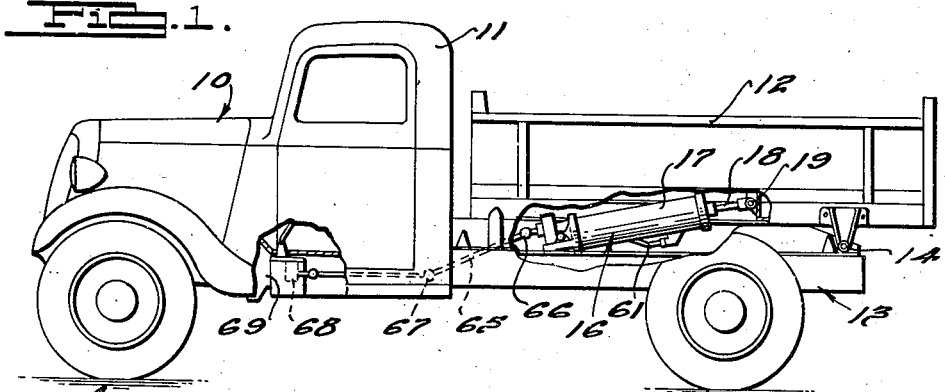
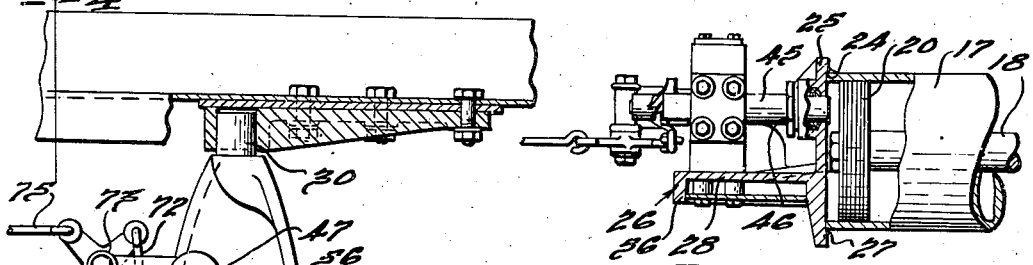
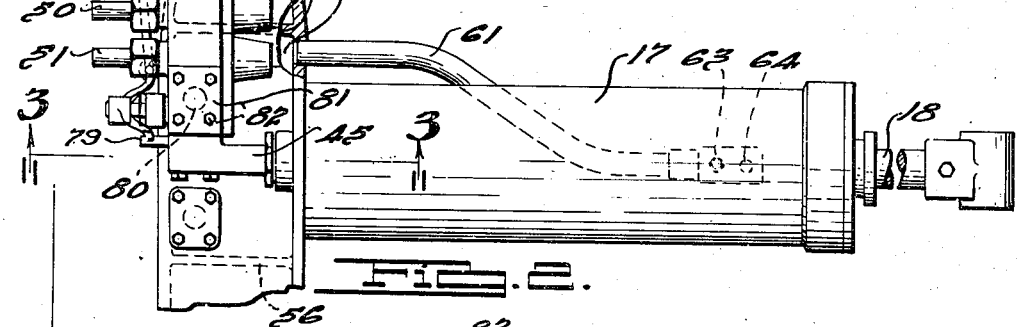
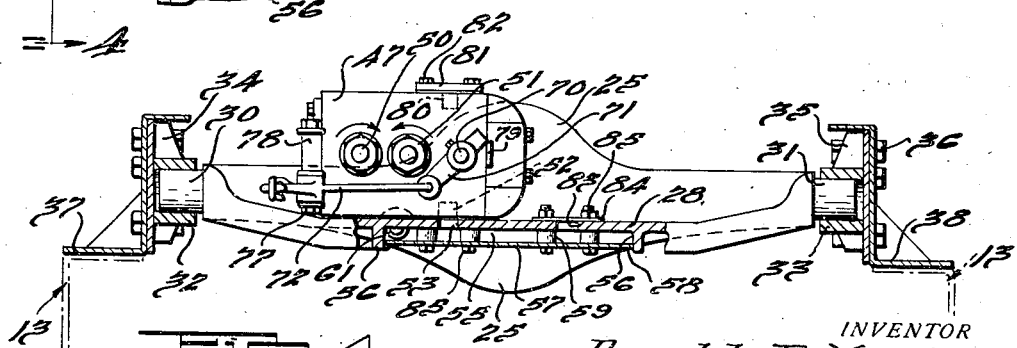
INVENTOR
Donald R. Merchant.
BY Harness, Dickey & Pierce
ATTORNEYS.

Patented Nov. 12, 1940

2,221,103

UNITED STATES PATENT OFFICE 2,221,103

HOISTING DEVICE

Donald R. Merchant, St. Clair Shores, Mich., assignor to Gar Wood Industries, Inc., Detroit, Mich., a corporation of Michigan Application June 9, 1939, Serial No. 278,187

3 Claims. (Cl. 60—52)

The invention relates generally to motor vehicles and it has particular relation to a truck having a tiltable body and a hydraulic hoisting device for tilting such body.

Generally, it is old to provide a truck having a tiltable body and a power-actuated device for tilting the body. A conventional device for this purpose comprises a hydraulic cylinder which pivotally connects the body to the frame so that by introducing fluid into the cylinder, the body is moved about its pivot. In one construction, fluid is delivered to the cylinder by means of a pump which in turn is driven by a drive in turn connected to a power take-off on the motor. The power take-off, in some instances, is located at one lateral side of the motor and in other instances at the other side of the motor and for this reason it has been necessary heretofore to construct devices designed, respectively, to be connected to the power take-off at one or the other side of the motor. Naturally, this introduced greater expense in the manufacture of the devices.

One object of the present invention is to provide a hydraulic device for elevating a truck body of the above mentioned character, wherein the arrangement is such that it may be used with a power take-off at either side of the motor.

Another object of the invention is to provide a hydraulic device of the last-mentioned character, which is adapted for use in connection with a power take-off shaft at either side of the motor, regardless of the direction of rotation of the shaft.

Other objects of the invention will become apparent from the following specification, from the drawing relating thereto, and from the claims hereinafter set forth.

For a better understanding of the invention, reference may be had to the drawing, wherein:

Figure 1 is a side elevational view of a truck with certain parts broken away, showing a structure embodying one form of the invention;

Fig. 2 is a fragmentary plan view, partly in cross-section, of the hydraulic device embodied in Fig. 1 for elevating the truck body;

Fig. 3 is a cross-sectional view taken substantially along the line 3—3 of Fig. 2; and Fig. 4 is a cross-sectional view taken substantially along the line 4—4 of Fig. 2.

Referring to Fig. 1, a truck is indicated generally at 10, and includes a driver's compartment 11 and a truck body 12. The body 12 is pivoted on the chassis frame 13 and in this instance the pivot for the body is at the rear end of the frame, as indicated at 14. For tilting the body about the pivot 14, a hydraulic cylinder device 16 is employed and this includes a cylinder 17 and a piston rod 18 which, at its outer end, is pivotally connected to the body at 19. As shown by Fig. 3, the piston rod projects into the cylinder 17 and has a piston 20 on its inner end and from this it will be apparent that upward tilting of the body may be effected by introducing fluid into the cylinder below the piston.

Still directing attention to Fig. 3, the end of the cylinder 17 fits in a recess 24 formed in an upright or flanged portion 25 of a pivotal support 26 and is secured in such recess by welding, as indicated at 27. The pivotal support has a base portion 28 substantially at right angles to the upright portion 25 and as shown by Fig. 4, such support has trunnions 30 and 31 at its ends which are journaled in bearings 32 and 33. These bearings are integral parts of brackets 34 and 35 which are secured by means of bolts 36 to angle irons 37 and 38 fastened in turn to the chassis frame 13. From the description so far given, it is apparent that the cylinder is secured to a pivotal support that extends transversely across the frame and which has trunnions at its ends journaled in bearings secured to the frame. This pivotal arrangement, in conjunction with the pivotal connection 19 at the outer end of the piston rod, allows the necessary movements of the cylinder required in tilting the truck body.

Referring to Figs. 2 and 3, fluid is conducted to the lower end of the cylinder by means of a conduit 45 that extends through an opening in the upright or flange 25 and which is secured to such upright by means of a packing nut 46. This conduit is connected to a hydraulic pump 47 of the type employing oppositely rotating and meshing gears and these gears are mounted on shafts 50 and 51, shown as projecting from the pump housing.

As seen in Fig. 4, the lower side of the pump has an inlet 52 communicating with an opening 53 formed in the base portion 28 of the pivotal support 26, and the latter opening communicates with a space 55 provided under such base and this base is formed jointly by the base, flanges 56, the lower part of upright 25, and a plate 57, which is secured to the base by welding indicated at 58. Bosses 59 are provided on the under side of the base 28 and these serve as spacers between the base and the plate 57.

The upper end of the cylinder, as shown best by Fig. 2, is connected to a conduit 61 that communicates with the space 55 under the base 28. It will be noted that the connection between the conduit 61 and the upper end of the cylinder includes two port openings, indicated at 63 and 64, and this construction is such that the piston 20 may pass the lower port 63 and allow circulation of the fluid through the pump, space 55, and the lower end of the cylinder, when the truck body is in its highest position.

Operation of the pump is effected by means of a drive shaft 65, including flexible or universal joints 66 and 67 and the front end of this shaft is drivingly connected to a power take-off 68, located at one side of the engine motor 69. This drive shaft 65 may be connected to either of the shafts 50 and 51 projecting from the pump, depending on the direction in which the drive shaft turns, and with the pump in the position shown by the figures, the shafts 50 and 51 should be driven in directions indicated by the arrows in Fig. 4. A control valve within the pump housing is mounted on a shaft 70 projecting from the housing and this shaft has an arm 71 secured thereto, which in turn is connected to a link 72. This link, as best shown by Fig. 2, is connected to one end of a bell crank 73 that is pivotally mounted on an arm 74 integral with the pump housing. The other end of the bell crank is connected to an operating rod 75 which may extend forwardly and into the driver's compartment for manipulation.

As shown by Fig. 4, the bell crank 73 is secured in position by means of a bolt 77 which extends through an eye 78 on the arm 74 and such eye is so located intermediate the top and bottom of the pump, that the bell crank may be located at either end of the eye. Likewise, the arm 71 may be adjusted or moved to a different position to correspond with shifting of the link and bell crank to the other end of the eye 78. It may be noted that a stop 79 is provided on the pump housing to limit movement of the valve arm.

Now, as shown by Figs. 2 and 4, the upper side of the pump has a second inlet opening 80 in vertical alignment with opening 52, and the former in this instance is closed by a cap plate 81, secured by screws 82 threaded into openings in the pump housing. Also, as will be observed in these figures, the base 28 of the pivotal support has an opening 83 which corresponds to the opening 53, and with the pump in the position shown, this opening 83 is closed by means of a plate 84 held in position by bolts 85. These bolts pass through the plate 57, certain of the bosses 59, and through the base 28. Similar bolts extending through the plate 57, the other bosses, and through the base 28, are threaded into threaded openings in the pump housing around the opening 52 and thereby secure the pump in place.

It is now to be observed that by disconnecting the conduit 45 from the cylinder, removing the bolts 85 that hold the pump in position, and removing the cap plates 81 and 84, that the pump may be turned through 180° so that the entry opening 80 becomes disposed over opening 83 in the base 28. The conduit 45 may now be connected to the cylinder in the same manner as before and the pump fastened to the base 28 by the bolts which previously secured the cap 84 in place. Then, the cap 84 may be fastened in place over opening 53 in the base 28 and the cap 81 fastened in place over opening 52 in the now upper side of the pump housing. Then, the valve arm 71, bell crank 73, and link 72 may be removed and reassembled in a like relation at the opposite side of the eye 78 by shifting the bell crank to the opposite end of the eye and shifting arm 71 about 90° clockwise.

While a pump of this general character is simple in construction, it is to be observed, as seen in Fig. 4, that liquid is drawn through the opening 53 and into the pump and forced under pressure out of the conduit 45 and into the lower end of the cylinder. Movement of the piston forces the liquid above it through the return conduit 61 and into the space 55. By having a pump and pivotal support for the cylinder, as shown and described, the pump and associated parts may be disposed in one position or the other so that the shafts 50 and 51 are at one side or the other of the longitudinal center line of the vehicle. The drive shaft connected to the engine power take-off may thus be connected to either shaft 50 or shaft 51 and the pump operated in the same manner regardless of the direction of turning of the drive shaft or its position.

The valve on shaft 70 is shiftable to control the flow of liquid through the pump and hence the rate of operation, and it is to be understood that arm 71 is operable to effect this control whether the pump is in one position or the other. This permits the manufacturer to furnish a single pump arrangement adapted for use on trucks regardless of the location of the power take-off.

Although only one form of the invention has been illustrated and described in detail, it will be apparent to those skilled in the art that various modifications may be made without departing from the scope of the appended claims.

What is claimed is:

1. In a truck body hoisting apparatus, a supporting base member adapted to be supported on a truck frame, means including a spacing plate forming a fluid space on one side of the base, said base having spaced openings communicating with said space, a pump having a projecting shaft for driving it and having intake openings in two opposite sides, means for securing the pump on the base in selective positions with an intake opening aligned with one of the openings in the base, and means for closing the other openings when the pump is in any one position.

2. In a truck body hoisting apparatus, a supporting member adapted to be supported on a truck frame and having a base and a flange at one edge of the base, means forming a fluid space at one side of the base, said base having a pair of openings communicating with said space, a pump having a driving shaft and a discharge opening, and also having a pair of intake openings at opposed sides, respectively, of the pump housing, means for securing the pump to the base in one position with one intake opening aligned and communicating with one opening in the base or in a reversed position with the other openings aligned and communicating, a cylinder secured to and projecting from the outer side of the flange, and means including a conduit connecting the cylinder to the discharge opening of the pump, the arrangement being such that the pump in each position is connected to the cylinder by the same conduit while a different intake opening is employed in each position.

3. A cross-head for hydraulic hoist apparatus comprising an elongated base member, trunnions at opposite ends of said base member, said base member having a reservoir therein, said reservoir having an inlet opening and two outlet openings equi-distantly spaced at opposite sides of the transverse center line of said base, either of which is adapted to receive a hydraulic pump, said base member being adapted to receive and have a hydraulic ram mounted thereupon at the midpoint of said base, said base having a pump discharge opening to communicate with such ram, and located at the midpoint thereof.

DONALD R. MERCHANT.